United States Patent
Noll et al.

(10) Patent No.: US 10,831,383 B2
(45) Date of Patent: Nov. 10, 2020

(54) COMMAND LINE VOTING USING HASHING

(71) Applicant: HAMILTON SUNDSTRAND CORPORATION, Charlotte, NC (US)

(72) Inventors: Christopher Brian Noll, Glastonbury, CT (US); Steven A. Avritch, Bristol, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 259 days.

(21) Appl. No.: 16/179,152

(22) Filed: Nov. 2, 2018

(65) Prior Publication Data
US 2020/0142610 A1 May 7, 2020

(51) Int. Cl.
| G06F 12/00 | (2006.01) |
| G06F 3/06 | (2006.01) |
| G06F 21/76 | (2013.01) |
| H04L 9/06 | (2006.01) |

(52) U.S. Cl.
CPC .......... *G06F 3/0619* (2013.01); *G06F 3/0656* (2013.01); *G06F 3/0659* (2013.01); *G06F 3/0673* (2013.01); *G06F 21/76* (2013.01); *H04L 9/0643* (2013.01)

(58) Field of Classification Search
None
See application file for complete search history.

(56) References Cited

U.S. PATENT DOCUMENTS

| 4,873,685 | A | 10/1989 | Millis, Jr. |
| 5,271,023 | A | 12/1993 | Norman |
| 7,552,419 | B2 | 6/2009 | Zimmer et al. |
| 7,912,931 | B2 | 3/2011 | Ahmed et al. |
| 8,576,283 | B1 | 11/2013 | Foster et al. |
| 9,264,234 | B2 | 2/2016 | Farrugia et al. |
| 9,762,611 | B2 | 9/2017 | Wallace et al. |
| 9,853,974 | B2 | 12/2017 | Hampel et al. |
| 10,078,565 | B1 | 9/2018 | Petersson |
| 2007/0220369 | A1 | 9/2007 | Fayad et al. |
| 2007/0253623 | A1* | 11/2007 | Ohira .................. G06K 9/4638 382/218 |
| 2008/0310729 | A1* | 12/2008 | Yoshino .............. G06K 9/4671 382/194 |
| 2012/0117419 | A1 | 5/2012 | Hillman et al. |
| 2018/0129826 | A1 | 5/2018 | Kim et al. |
| 2019/0273909 | A1* | 9/2019 | Ye ......................... G01B 11/14 |

* cited by examiner

*Primary Examiner* — Jason W Blust
(74) *Attorney, Agent, or Firm* — Cantor Colburn LLP

(57) ABSTRACT

Systems and methods for command line voting are provided. Aspects include obtaining, by an output logic device, a plurality of memory blocks from a plurality of buffers, each of the plurality of memory blocks including two or more output commands generated from a processing circuit based on a sensor data input, generating, by a hash function, a hash value for each of the plurality of memory blocks, comparing the hash value for each of the plurality of memory blocks to determine an output memory block from the plurality of memory blocks, and outputting, to an output hardware, the two more output commands from the output memory block.

20 Claims, 3 Drawing Sheets

COMMAND LINE VOTING USING HASHING

BACKGROUND

Exemplary embodiments pertain to the art of command line voting and more particularly to command line voting using cryptographic hashing.

High integrity processing systems, typically, utilize two or more processing lanes within a computer to cross check calculated results and associated output commands prior to sending those output commands to the output hardware in the system. However, when two or more computing lanes have cross checked output commands, an issue can arise based on the susceptibility of the computer system when transferring the output command from the processors to an output hardware. Verifying that the cross checked output commands are transferred to the output hardware correctly requires an independent output vote function. Some verification operations include the performance of bit-wise comparison of the output commands on the two or more processing lanes for a fixed set of interfaces in an output hardware's memory space.

BRIEF DESCRIPTION

Disclosed is a system. The system includes a plurality of buffers associated with a plurality of processing circuits, at least one sensor configured to collect sensor data and transmit the sensor data to the plurality of processing circuits, the plurality of processing circuits configured to analyze the sensor data and generate an output command for storing in a memory block in the each of the plurality of buffers, and an output logic device configured to obtain a memory block from each of the plurality of memory blocks, generate, utilizing a hash function, a hash value for each of the plurality of message blocks, compare the hash value for each of the plurality of memory blocks to determine an output memory block from the plurality of memory blocks, and output, to an output hardware, the two or more output commands from the output memory block.

Also disclosed is a method. The method includes obtaining, by an output logic device, a plurality of memory blocks from a plurality of buffers, each of the plurality of memory blocks including two or more output commands generated from a processing circuit based on a sensor data input, generating, by a hash function, a hash value for each of the plurality of memory blocks, comparing the hash value for each of the plurality of memory blocks to determine an output memory block from the plurality of memory blocks, and outputting, to an output hardware, the two more output commands from the output memory block.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
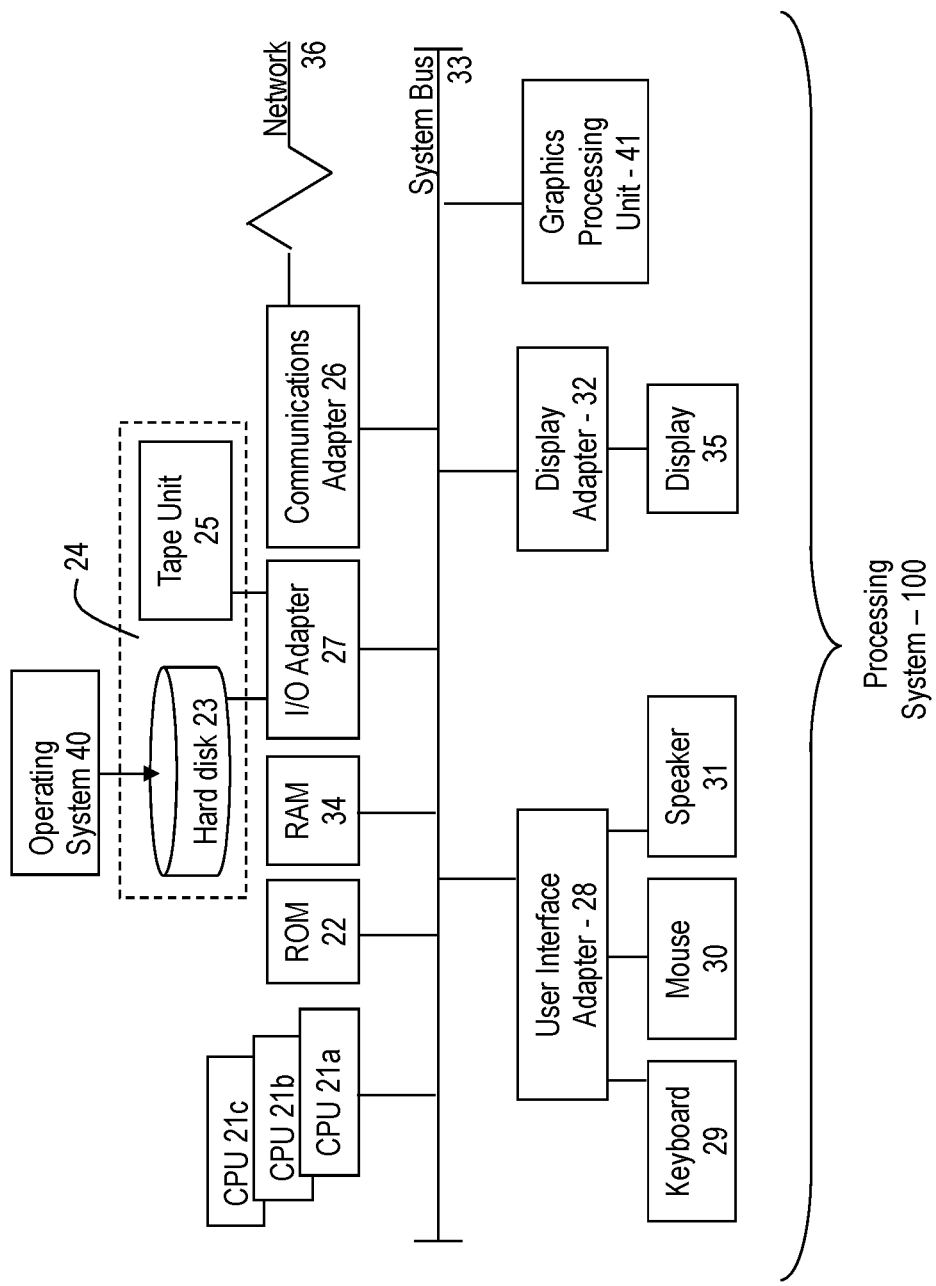
FIG. 1 depicts a block diagram of a computer system for use in implementing one or more embodiments of the disclosure.

Referring to FIG. 1, there is shown an embodiment of a processing system 100 for implementing the teachings herein. In this embodiment, the system 100 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 (RAM) and various other components via a system bus 33. Read only memory (ROM) 22 is coupled to the system bus 33 and may include a basic input/output system (BIOS), which controls certain basic functions of system 100.

FIG. 1 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 100 may be stored in mass storage 24. A network communications adapter 26 interconnects bus 33 with an outside network 36 enabling data processing system 100 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel. The processing system 100 described herein is merely exemplary and not intended to limit the application, uses, and/or technical scope of the present disclosure, which can be embodied in various forms known in the art.

Thus, as configured in FIG. 1, the system 100 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 1.

FIG. 1 is merely a non-limiting example presented for illustrative and explanatory purposes.

Turning now to an overview of technologies that are more specifically relevant to aspects of the disclosure, high integrity processing systems, typically, utilize two or more processing lanes within a computer to cross check calculated results and associated output commands prior to sending those output commands to the output hardware in the system. However, when two or more computing lanes have cross checked output commands, an issue can arise based on the susceptibility of the computer system when transferring the output command from the processors to an output hardware. Verifying that the cross checked output commands are transferred to the output hardware correctly requires an independent output vote function and accompanying circuitry. Some verification operations include the performance of bit-wise comparison of the output commands on the two or more processing lanes for a fixed set of interfaces in an output hardware's memory space. A need exists for an efficient process for verifying the output commands transmitted on two or more processing lanes.

Turning now to an overview of the aspects of the disclosure, one or more embodiments address the above-described shortcomings of the prior art by providing a command line voting function using cryptographic hashing. The voting function treats a block of output commands as a message block containing a set of output identifier and output command pairs written to a processor specific buffer in a system output control hardware. As described above, the voting function is receiving a cross checked calculated result (e.g., output command) from processing devices using two or more processing lanes. Each processing lane writes an identical output message block (e.g., a block of output commands) based on previous cross processing lane comparisons. A hardware device generates a cryptographic hash value (e.g., SHA256) for each output message block and compares the hash value for each processor output buffer. If all hash values are the same, this is interpreted by the voting function as an indication that voted output command buffer has been correctly transferred by each processing lane and the data is valid to output to the output hardware. If only a certain number of output command buffers match based on the hash comparison, the hardware device can utilize a voting algorithm to select an appropriate output command buffer for use with the external devices connected with the system.

Figure 2:
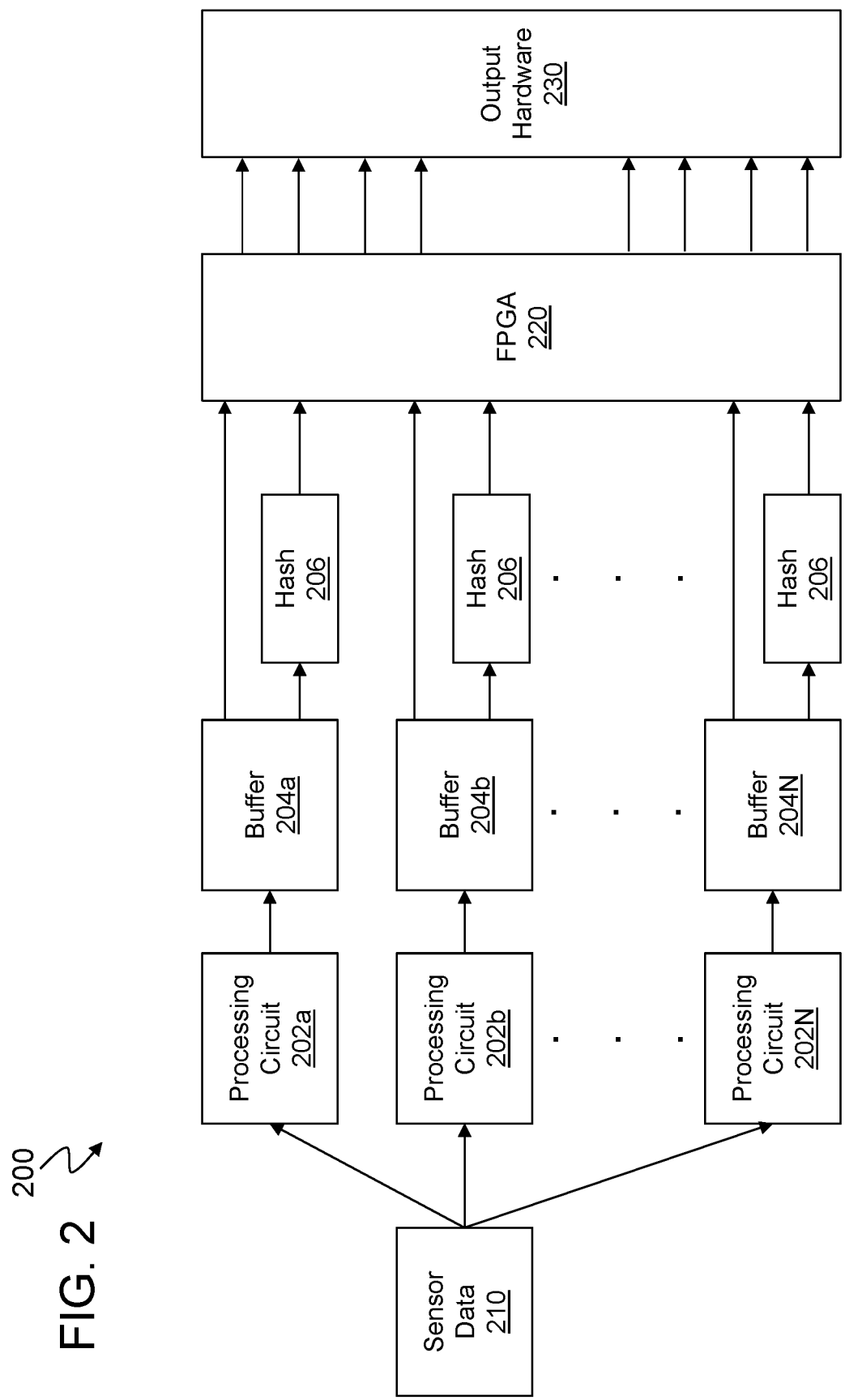
FIG. 2 depicts a block diagram of a system for command line voting utilizing a cryptographic hash in accordance with one or more embodiments of the disclosure.

Turning now to a more detailed description of aspects of the present invention, FIG. 2 depicts a system 200 for command line voting utilizing a cryptographic hash according to one or more embodiments. The system 200 includes one or more processing circuits 202a, 202b . . . 202N (where N is an integer value greater than 2). In one or more embodiments, the processing circuits 202 receive sensor data 210 from one or more sensors and utilize this sensor data to determine an output command to be transmitted to an output hardware 230. For example, the sensor data 210 can be reading taken from any type of sensor including, but not limited to, temperature sensors, position sensors, and the like. These sensors are utilized for providing commands to output hardware 230 that will operated based on this sensor data 210. For example, a thermostat may operate a compressor based on a temperature reading. The temperature reading is analyzed by the processing circuits 202, for example, and an output command is sent to the compressor to initiate the action (e.g., engage the compressor). In highly critical systems, the output commands from the processing circuits 202 are initially cross checked between processing circuits 202. Once cross checked and an agreed upon output command is generated, each processing circuit 202 outputs the agreed upon output command. For high criticality systems, the output command is subjected to a voting algorithm to verify the output command before being passed along to the output hardware 230. As described above, typical systems compare each and every output command before passing the verified output command to the output hardware 230. In one or more embodiments, the output hardware 230 includes any number or types of electrical or mechanical system components. If the output commands do not match, typically, a voting algorithm will select a majority output command (e.g., 2 out of 3 match) to utilize as the output command forwarded to the output hardware 230.

In one or more embodiments, the processing circuits 202, FPGA 220, and output hardware 230 and any other component of FIG. 2 can be implemented using any of the components of the processing system 100 found in FIG. 1.

In one or more embodiments, the system 200 includes a plurality buffers 204a, 204b . . . 204N (where N is an integer value greater than 2) and a plurality of processing circuit 202a, 202b . . . 202N. The system 200 also includes a cryptographic hash 206 and a field programmable gate array (FPGA) 220 that is utilized for output command voting before being sent to the output hardware 230. In one or more embodiments, the plurality of buffers 204a, 204b . . . 204N are contained within the FPGA 220. The buffers 204 includes an address that can have an associated hash value stored. When the processing circuits 202 generate an output command, the output command is stored in the output command buffer 204. In one or more embodiments, after a specified number of output commands are written to the buffer 204, the entire buffer or portions of the buffer 204 can be fed through a cryptographic hashing function to generate a hash 206 value for the buffer 204. The FPGA 220 can then compare the hash 206 values for each buffer 204 and if all the hash 206 values match, the FPGA can utilize any one of the buffers 204a, 204b . . . 204N as the output commands. With this process, the FPGA 220 performs one comparison operation on all the output commands in the buffer 204 instead of doing a comparison operation each time there is an output command generated by the processing circuit 202. In one or more embodiments, the number of output commands in the buffers 204 can match the number of FPGA outputs to the output hardware 230. In one or more embodiments, the processing circuits 202 can fill the buffer 204 with a set of data and then write the count to another register within the FPGA as a signal to the FPGA 220 that the buffer 204 is filled with "N" sets of data and ready to be processed. In this case, each processing circuit 202 would have its own "buffer count" register that is updated after the buffer 204 is filled to tell the FPGA 220 how much data is in that buffer 204. While the additional register is not shown in the illustrated embodiment, multiple registers and/or buffers can included in the circuitry of the FPGA 220. The FPGA can provide status related to processing the output buffers 204 to indicate a successful update or the detection of dissimilar data among the buffers 204. As part of the FPGA processing, the source data to be output is copied to an internal buffer within the FPGA for actual output processing. This double buffering mechanism prevents a race condition between the CPUs update of the 204 buffers with a new set of outputs and the FPGA processing the current set of outputs.

In one or more embodiments, the hash 206 is generated by a cryptographic hash function such as, for example, secure hash algorithm 2 (SHA-2).

Figure 3:
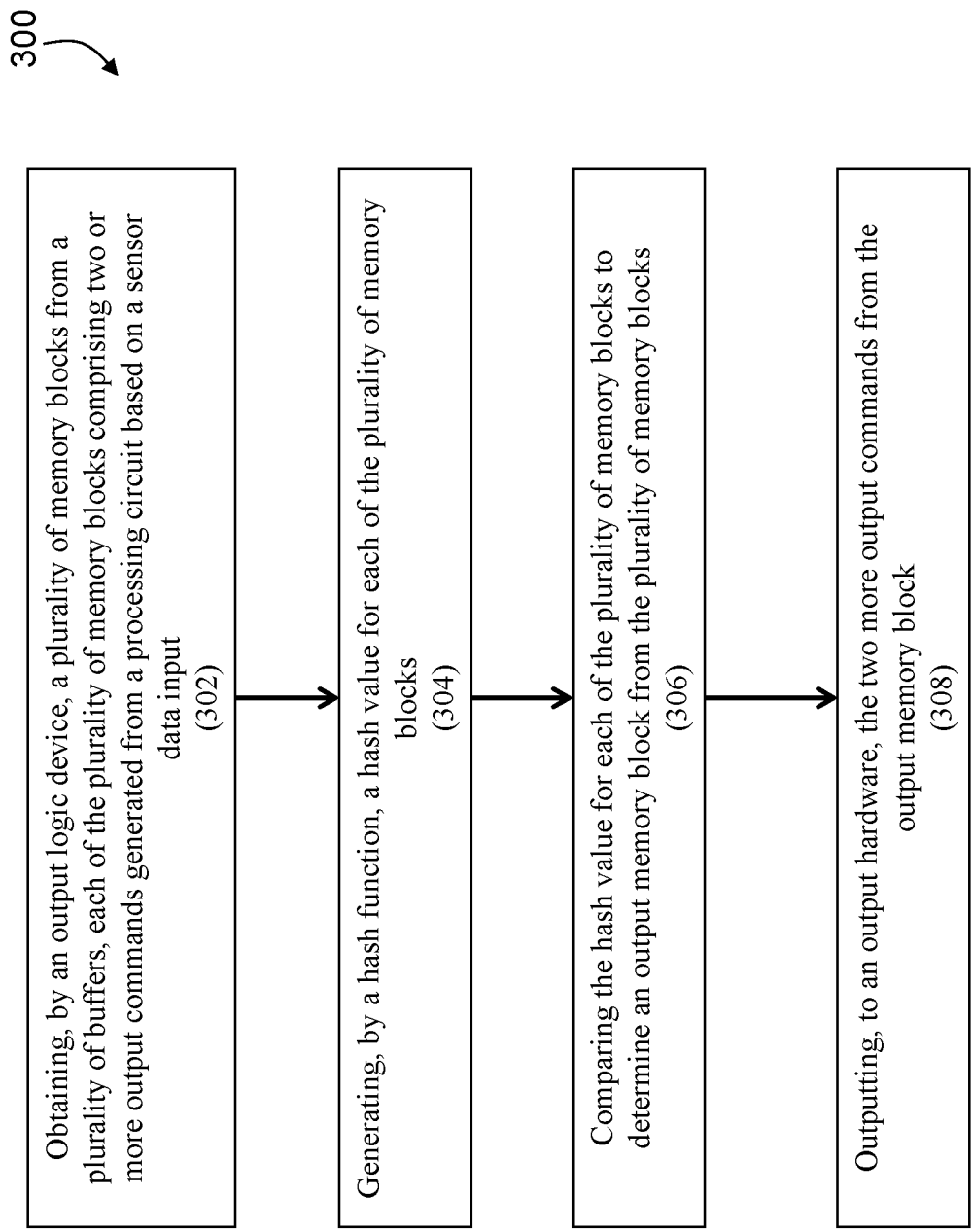
FIG. 3 is a process flow of a method in accordance with an embodiment of the disclosure.

FIG. 3 depicts a flow diagram of a method for command line voting utilizing hashing according to one or more embodiments. The method 300 begins at process step 302 which is obtaining, by an output logic device, a plurality of memory blocks from a plurality of buffers, each of the plurality of memory blocks comprising two or more output commands generated from a processing circuit based on a sensor data input. The commands are generated based on the sensor data taken from an accompanying sensor. For example, in a control system, the sensor data is utilized to adjust components in an electrical-mechanical system, such as an aircraft. If a temperature sensor reads a certain temperature, the control system will need to adjust a fan or air flow within the electrical-mechanical system which is done by transmitting an output command to the output hardware controlling the various components. For high criticality systems, fault tolerance is utilized to continue working in the presence of potential errors. At process step 304, the method 300 includes generating, by a hash function, a hash value for each of the plurality of memory blocks. The hash value is utilized to map data of a certain size (e.g., the two or more output commands in the memory blocks) to a fixed size value. At process step 306, the method 300 includes comparing the hash value for each of the plurality of memory blocks to determine an output memory block from the plurality of memory blocks. Here the hash value is a mapped value of all the output commands stored in the memory blocks. So, instead of comparing each and every output command for error checking, embodiments provide for the comparing of the hash value for a block of output command thus reducing the number of comparisons. At block 308, the method 300 then includes outputting, to an output hardware, the two more output commands from the output memory block.

Additional processes may also be included. It should be understood that the processes depicted in FIG. 3 represent illustrations and that other processes may be added or existing processes may be removed, modified, or rearranged without departing from the scope and spirit of the present disclosure.

To ensure that the output data from the CPUs 202 arrives in a synchronized fashion, the FPGA 220 can set a timer to ensure that the time between the first buffer 204a being updated and the last buffer 204N being updated is within some tolerance (i.e. the tolerance allowed between the multiple CPU lanes being synchronized. This also prevents the system 200 from hanging by waiting for the last CPU to update.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for command line voting, the method comprising:
    obtaining, by an output logic device, a plurality of memory blocks from a plurality of buffers, each of the plurality of memory blocks comprising two or more output commands generated from a processing circuit based on a sensor data input;
    generating, by a hash function, a hash value for each of the plurality of memory blocks;
    comparing the hash value for each of the plurality of memory blocks to determine an output memory block from the plurality of memory blocks; and
    outputting, to an output hardware, the two or more output commands from the output memory block.

2. The method of claim 1, wherein the determining the output memory block comprises:
    comparing the hash value for each of the plurality of memory blocks; and
    designating any of the plurality of memory blocks as the output memory block based on the hash value for each of the plurality of memory blocks having matching values.

3. The method of claim 1, wherein the determining the output memory block comprises:
    comparing the hash value for each of the plurality of memory blocks; and
    designating any of a majority matching memory block in the plurality of memory blocks as the output memory blocks based on the hash value for each of the plurality of memory blocks having a majority matching value.

4. The method of claim 1, wherein the plurality of memory blocks further comprises address data for each of the two or more output commands.

5. The method of claim 4, wherein the outputting, to the output hardware, the two or more output commands from the output memory block is based at least in part on the address data.

6. The method of claim 1, wherein the output hardware comprises a component in an electrical-mechanical system.

7. The method of claim 1, further comprising responsive to outputting the two or more output commands from the output memory block, removing the plurality of memory blocks from the plurality of buffers.

8. The method of claim 1, wherein the hash function comprises a cryptographic hash function.

9. The method of claim 8, wherein the cryptographic hash function comprises a secure hash algorithm 2 (SHA-2).

10. The method of claim 1, wherein the output logic device comprises a field programmable gate array (FPGA).

11. A system for command line voting, the system comprising:
    a plurality of buffers associated with a plurality of processing circuits;

at least one sensor configured to collect sensor data and transmit the sensor data to the plurality of processing circuits, the plurality of processing circuits configured to analyze the sensor data and generate an output command for storing in a memory block in the each of the plurality of buffers;

an output logic device configured too: obtain a memory block from each of the plurality of memory blocks; compare the hash value for each of the plurality of memory blocks to determine an output memory block from the plurality of memory blocks;

output, to an output hardware, two or more output commands from the output memory block.

12. The system of claim 11, wherein the determining the output memory block comprises:

comparing the hash value for each of the plurality of memory blocks; and designating any of the plurality of memory blocks as the output memory block based on the hash value for each of the plurality of memory blocks having matching values.

13. The system of claim 11, wherein the determining the output memory block comprises:

comparing the hash value for each of the plurality of memory blocks; and designating any of a majority matching memory block in the plurality of memory blocks as the output memory block based on the hash value for each of the plurality of memory blocks having a majority matching value.

14. The system of claim 1, wherein the plurality of memory blocks further comprises address data for each of the two or more output commands.

15. The system of claim 14, wherein the outputting, to the output hardware, the two or more output commands from the output memory block is based at least in part on the address data.

16. The system of claim 11, wherein the output hardware comprises a component in an electrical-mechanical system.

17. The system of claim 11, wherein the output logic device is further configured to responsive to outputting the two or more output commands from the output memory block, remove the plurality of memory blocks from the plurality of buffers.

18. The system of claim 11, wherein the hash function comprises a cryptographic hash function.

19. The system of claim 18, wherein the cryptographic hash function comprises a secure hash algorithm 2 (SHA-2).

20. The system of claim 11, wherein the output logic device comprises a field programmable gate array (FPGA).

* * * * *